(12) United States Patent
Rosener

(10) Patent No.: US 8,760,310 B2
(45) Date of Patent: Jun. 24, 2014

(54) CLIP-WORN DEVICE WITH DON/DOFF SENSOR

(75) Inventor: Douglas Kenneth Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 626 days.

(21) Appl. No.: 12/266,290

(22) Filed: Nov. 6, 2008

(65) Prior Publication Data

US 2010/0109895 A1 May 6, 2010

(51) Int. Cl.
*G08B 21/00* (2006.01)

(52) U.S. Cl.
USPC ............... 340/686.1; 340/686.4; 340/573.4

(58) Field of Classification Search
USPC .......... 340/686.1, 686.3, 686.4, 500, 502, 340/573.1, 573.4, 604, 605; 381/74; 382/124; 63/14.4, 14.5; 24/599.6; 600/424, 344, 500, 559; 64/14.4, 14.5; 72/409.19, 413; 351/41, 158
See application file for complete search history.

(56) References Cited

U.S. PATENT DOCUMENTS

| | | | |
|---|---|---|---|
| 4,679,280 A * | 7/1987 | Krahenbuhl | 24/599.6 |
| 4,796,443 A * | 1/1989 | Bannister et al. | 63/14.5 |
| 4,979,379 A * | 12/1990 | Quaranto | 63/14.4 |
| 6,285,895 B1 * | 9/2001 | Ristolainen et al. | 600/323 |
| 6,704,428 B1 | 3/2004 | Wurtz | |
| 6,757,557 B1 * | 6/2004 | Bladen et al. | 600/424 |
| 7,010,332 B1 | 3/2006 | Irvin et al. | |
| 7,059,166 B2 * | 6/2006 | Bowles et al. | 72/413 |
| 7,586,418 B2 * | 9/2009 | Cuddihy et al. | 340/573.1 |
| 7,677,723 B2 * | 3/2010 | Howell et al. | 351/158 |
| 2004/0054291 A1 * | 3/2004 | Schulz et al. | 600/500 |
| 2005/0075550 A1 * | 4/2005 | Lindekugel | 600/344 |
| 2007/0076897 A1 | 4/2007 | Philipp | |
| 2007/0219457 A1 * | 9/2007 | Lo | 600/519 |
| 2007/0293287 A1 * | 12/2007 | Yu | 455/575.2 |
| 2008/0219456 A1 * | 9/2008 | Goldstein et al. | 381/56 |
| 2009/0041313 A1 * | 2/2009 | Brown | 382/124 |

* cited by examiner

*Primary Examiner* — Van T. Trieu
(74) *Attorney, Agent, or Firm* — Chuang Intellectual Property Law

(57) ABSTRACT

Clip-worn apparatuses having sensor clips configured to detect whether electronic devices, such as communications headsets, are being worn (i.e., "donned" or "DON'd") or are not being worn (i.e., "doffed" or "DOFF'd") by a user. An exemplary clip-worn apparatus includes a DON/DOFF sensor clip having a clip with a first end and an opposing second end. The first end includes a source (e.g., a light source). The opposing second end includes a detector (e.g., a light detector). When the clip-worn apparatus is DOFF'd, a detection path between the source and the detector is clear and unobstructed. When the clip-worn apparatus is DON'd (by clipping the DON/DOFF sensor clip to a target object, e.g., a user's ear), the target object becomes positioned between the source and the detector, thereby obstructing the detection path between the source and the detector.

26 Claims, 6 Drawing Sheets

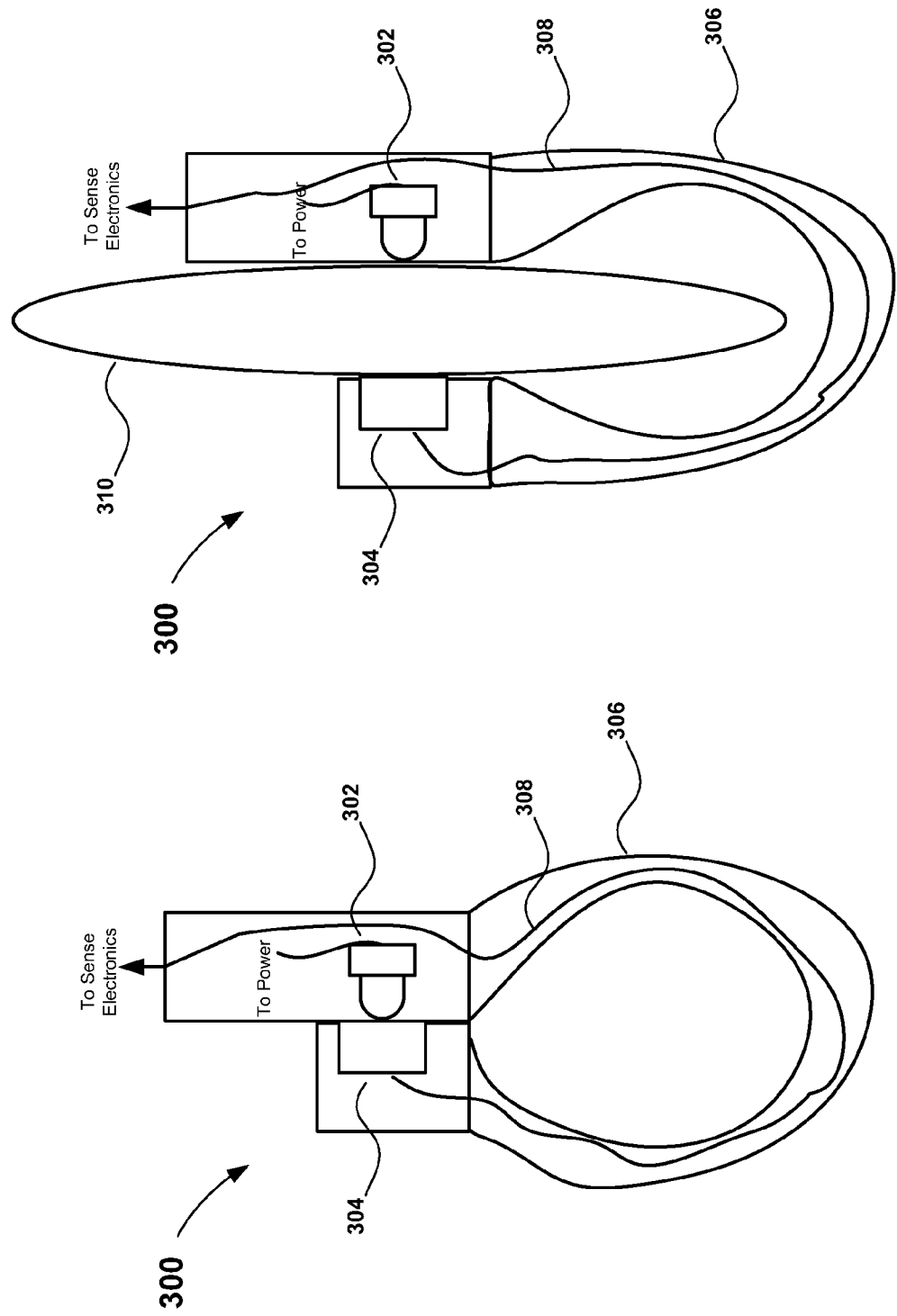

CLIP-WORN DEVICE WITH DON/DOFF SENSOR

FIELD OF THE INVENTION

The present invention relates to apparatuses that reliably detect whether a device is being worn by a user.

BACKGROUND OF THE INVENTION

Many types of electronic devices are designed to be worn by a user. Examples of such devices include headsets, headphones, microphones, etc. In some applications it is desirable to know or detect whether the device is being worn (i.e., "donned" or "DON'd") or not worn (i.e., "doffed" or "DOFF'd").

Various types of sensors have been proposed for detecting whether a device is being worn. In headset devices, for example, a sensor based on a mechanical switch is typically used. FIG. 1A (headset operational) and FIG. 1B (headset non-operational) are side-view drawings of a monaural type headset equipped with such a mechanical switch (in this case normally-open). The headset 100 comprises an ear piece 102 and a microphone boom 104 containing a mechanical switch 106. The ear piece 102 is connected to the microphone boom 104 at a pivot, which is not shown, allowing the microphone boom 104 to be rotated upwards (counter-clockwise in the side view of FIG. 1A). In FIG. 1A the mechanical switch 106 is open, indicating that the headset 100 is in the DON'd state. In FIG. 1B, which shows the same side view of the headset 100 when the microphone boom 104 has been rotated upwards, the mechanical switch 106 makes contact with the inner portion of the ear piece 102, indicating that the headset 100 is in a DOFF'd state.

Although DON/DOFF sensors based on mechanical switches can be used to detect the DON'd and DOFF'd states of a device, they are susceptible to false triggering. For example, if the device is placed in a handbag or briefcase while not in use, other items in the handbag or briefcase may inadvertently trigger the mechanical switch. Other types of DON/DOFF sensors are also susceptible to false triggering and/or have other drawbacks. It would be desirable, therefore, to have a DON/DOFF sensor for devices worn by a use that avoids false triggering and other drawbacks of prior art DON/DOFF sensors.

SUMMARY OF THE INVENTION

A clip-worn apparatus comprising a DON/DOFF sensor clip and an electronic device to be worn by a user is disclosed. As used herein, the term "electronic device" shall be interpreted to include electrical devices, including devices that are passive (i.e. not self-powered) and wired, such as a conventional headset. The electronic device may, for example, be a device for communication with a user. Examples of such communication devices are wired or unwired and active or passive headsets, headphones and other apparatuses for receiving or sending audio. These communication devices can be worn by the user in various forms including over-the-ear, in-the-ear and over-the-head. An exemplary DON/DOFF sensor clip comprises a spring-loaded clip having opposing ends, one including a light source and the other a light detector. When the clip-worn apparatus is not being worn ("DOFF'd" state), the spring-loaded action of the DON/DOFF sensor clip brings the opposing ends of the DON/DOFF sensor clip into contact and a light path between the light source and the light detector is unobstructed. When the clip-worn apparatus is worn by clipping the DON/DOFF sensor clip to a target object, the target object becomes positioned between the light source and light detector, thereby obstructing the light path between the light source and the light detector. Changes in the level of light detected by the light sensor are then mapped to DON/DOFF states according to the application.

Further features and advantages of the present invention, including a description of the structure and operation of the above-summarized and other exemplary embodiments of the invention, are described in detail below with respect to accompanying drawings, in which like reference numbers are used to indicate identical or functionally similar elements.

BRIEF DESCRIPTION OF THE DRAWINGS

FIG. 3A is a side-view drawing of a DON/DOFF sensor clip of the clip-worn apparatus in FIG. 2, in accordance with an embodiment of the present invention, where the DON/DOFF sensor clip is in a DOFF'd state and utilizes a light source and a light detector;

FIG. 3B is an alternative side-view drawing of the DON/DOFF sensor clip in FIG. 3A, where the DON/DOFF sensor clip is in a DON'd state;

DETAILED DESCRIPTION

Figure 1:
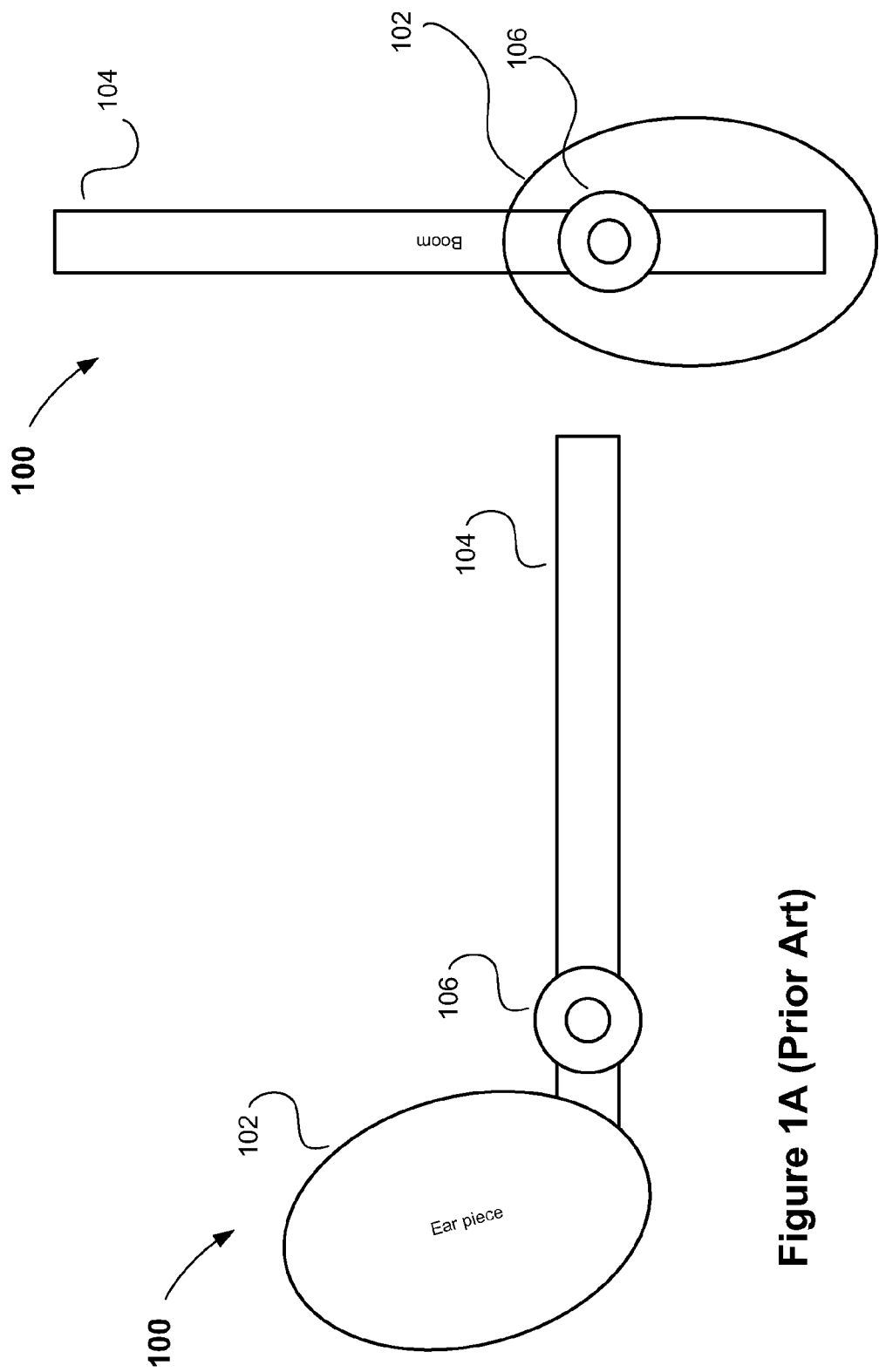
FIG. 1A is a side-view drawing of a headset employing a conventional mechanical-switch-based DON/DOFF sensor.
FIG. 1B is an alternative side-view drawing of the headset in FIG. 1A in a DOFF'd state.
Figure 2:
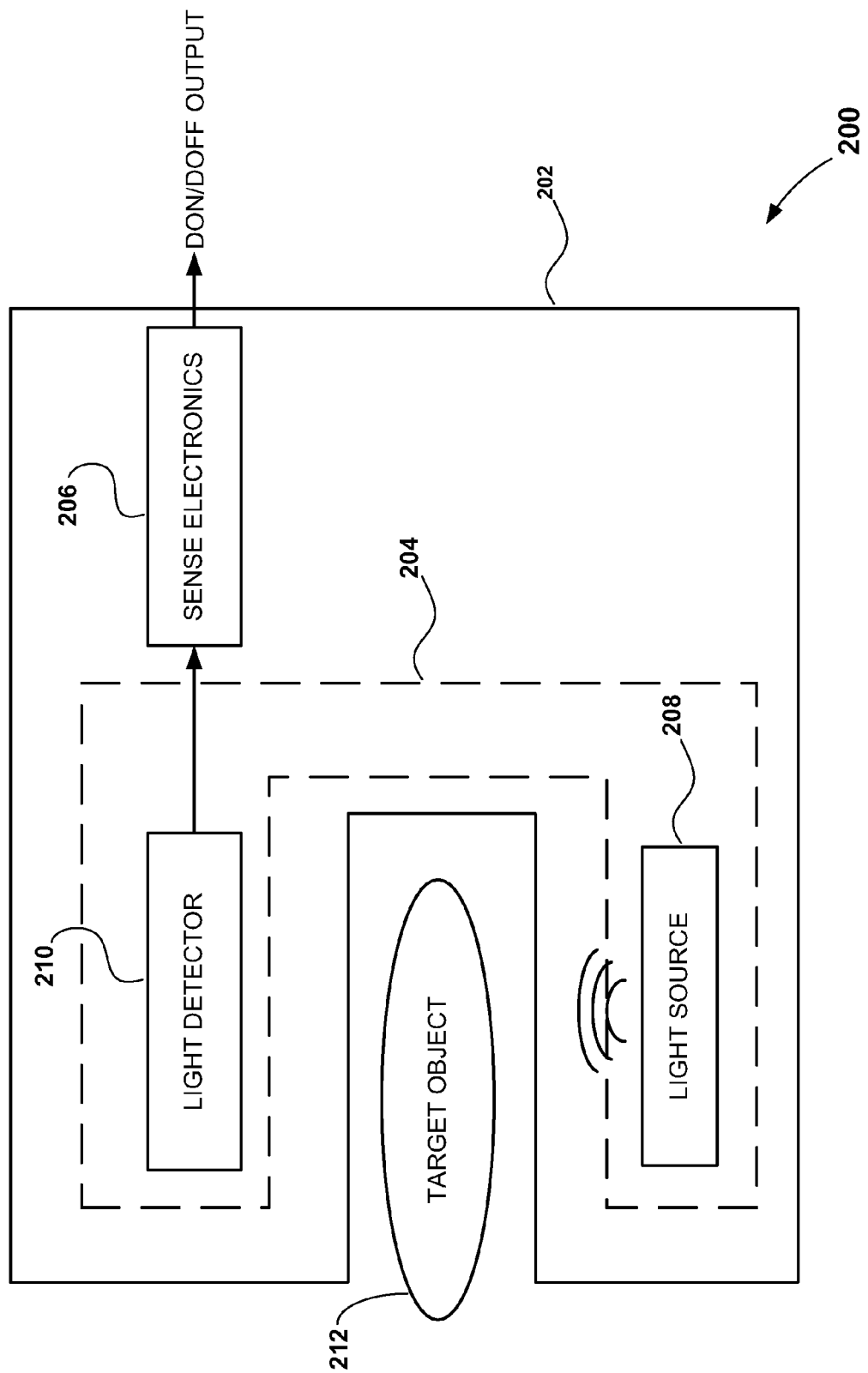
FIG. 2 is a block diagram of a clip-worn apparatus, according to an embodiment of the present invention.

Referring to FIG. 2, there is shown a block diagram of a clip-worn apparatus 200, according to an embodiment of the present invention. The clip-worn apparatus 200 comprises an electronic device 202 (for example, a communications headset), a DON/DOFF sensor clip 204 and sense electronics 206. The DON/DOFF sensor clip 204 comprises a light source 208 and a light detector 210.

During operation, the light source 208 of the DON/DOFF sensor clip 204, generates a signal that is detected or not detected by the light detector 210, depending on whether the clip-worn apparatus 200 is DON'd or DOFF'd. The presence or absence of a target object 212 between the light source 208 and the light detector 210 is what determines whether the clip-worn apparatus 200 is DON'd or DOFF'd. When the target object 212 is absent, the light path between the light source 208 and the light detector 210 is unobstructed. When the target object 212 is present, the light signal emitted by the light source 208 is occluded by the target object 212. The light detector 210 generates an electrical sense signal, based on the presence or absence of light detected by the light detector 210. The sense electronics 206 responds to the sense signal from the light detector 210 by generating a DON/DOFF electrical signal indicating whether the clip-worn apparatus 200 is DON'd or DOFF'd.

The DON/DOFF sensor clip 204 of the clip-worn apparatus 200 can be combined with a variety of electronic devices 202. In an exemplary embodiment that follows, the DON/DOFF sensor clip 204 is combined with a communications headset 202. In that case, the target object 212 may be the user's ear. However, it is understood by those skilled in the art that other target objects are possible. For example, in one embodiment, the communications headset is attached to the frame of a pair of eyeglasses serving as the target object, and thus in this usage, the DON/DOFF state indicates whether the frame of the pair of eyeglasses is positioned between the light source 208 and the light detector 210.

FIGS. 3A and 3B are side view drawings of an exemplary DON/DOFF sensor clip 300, which may be used to implement the DON/DOFF sensor clip 204 of the clip-worn apparatus 200 in FIG. 2. FIG. 3A shows the DON/DOFF sensor clip 300 in a DOFF'd state, and FIG. 3B depicts the same DON/DOFF sensor clip 300 in a DON'd state.

In this embodiment of the invention, the DON/DOFF sensor clip 300 comprises a light source 302, a light detector 304, a clip 306, and an electrical wire 308. The light source 302 emits light that can be of various wavelengths; for example, in the visible or infrared spectrum. It is powered either by internal battery or from an external power source (not shown) fed to the device. Opposite the light source 302 is a light detector 304, positioned in line with the light source 302. The light detector 304 is operable to detect light emitted by the light source 302, and in one embodiment comprises a photodiode. The clip 306 includes opposing ends, a first containing the light source 302 and the second containing the light detector 304. The clip 306 also provides physical support for the light source 302 and the light detector 304, keeping the light source 302 and the light detector 304 aligned. In accordance with one embodiment, the clip 306 is spring loaded, so that in the resting state, when the clip-worn apparatus is not being worn (DOFF'd), the light source 302 and light detector 304 are brought proximally adjacent to each other. In this resting state, as shown in FIG. 3A, the light that is emitted by the light source 302 travels to the light detector 304, which detects the presence of the light. The light detector 304 then signals to the sense electronics (not shown) this detection event via the electrical wire 308. In this state, the sensor indicates a DOFF'd event, since a target object 310 is not between the light source 302 and light detector 304.

FIG. 3B shows the same light DON/DOFF sensor clip 300 configured in a DON'd state. In this alternative drawing of the embodiment, a target object 310, such as the user's ear has been positioned between the light source 302 and light detector 304. The target object 310 occludes or semi-occludes the path of the light from the light source 302 to the light detector 304. Thus, the sense signal sent from the light detector 304 to the sense electronics, via the electrical wire 308, corresponds to a DON'd event. To further reduce false triggers, the frequency response and/or sensitivity of the light detector 304 can be restricted so that other types of objects besides the desired target 310 (e.g. the user's ear) do not undesirably trigger the light detector 304.

The clip-worn apparatus 200 and DON/DOFF sensor clip 300 in FIG. 2 and FIGS. 3A and 3B, as well as the other DON/DOFF sensors clips described below, afford several advantages over conventional clip-worn apparatuses and DON/DOFF sensors. For example, in the DON/DOFF sensor clip 300 in FIG. 3, since the light source 302 end and the light detector 304 end of the clip 306, are always covered from the surrounding environment, the light detector 304 cannot be falsely triggered, thereby preventing inadvertently generating a spurious DON or DOFF event. Further, because the spring-loaded action of the clip 306 keeps the two ends of the clip 306 abutting at rest, it is less likely for loose objects to trigger the light detector 304, for example in the case that the associated electronic device 202 of the clip-worn apparatus 200 is placed in a pocket or handbag.

Figure 4B:
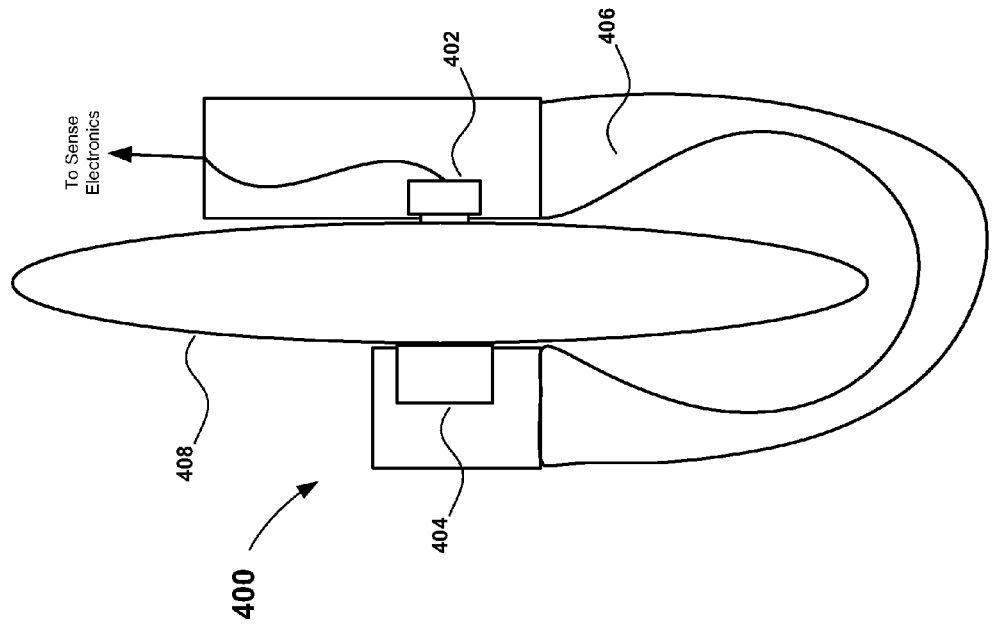
FIG. 4B is an alternative side-view drawing of the DON/DOFF sensor clip in FIG. 4A, where the DON/DOFF sensor clip is in a DON'd state.
Figure 4A:
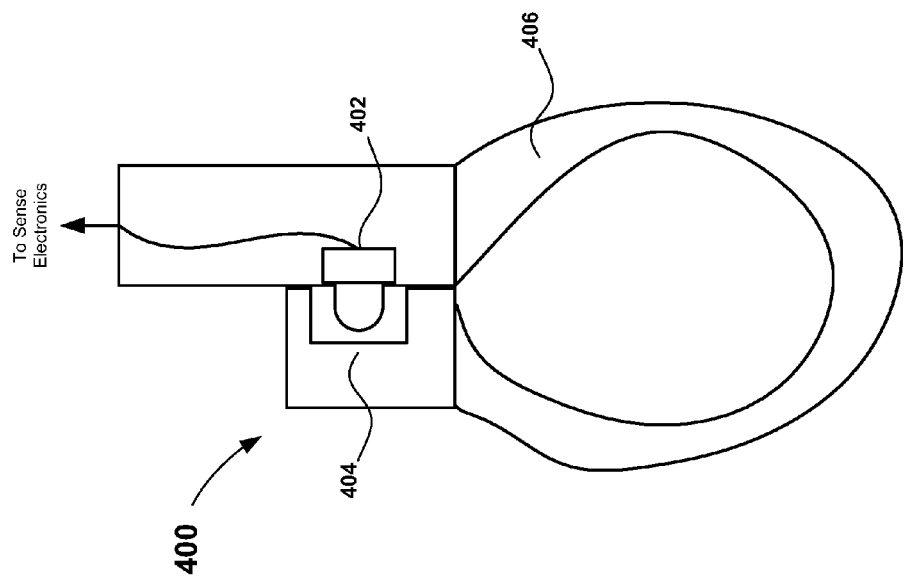
FIG. 4A is a side-view drawing of a DON/DOFF sensor clip of the clip-worn apparatus in FIG. 2, in accordance with an embodiment of the present invention, where the DON/DOFF sensor clip is in a DOFF'd state and utilizes a mechanical switch.

FIGS. 4A and 4B are drawings of another DON/DOFF sensor clip 400 that may be used to implement the DON/DOFF sensor clip 204 of the clip-worn apparatus 200 in FIG. 2, in accordance with an embodiment of the present invention. The DON/DOFF sensor clip 400 comprises a mechanical switch 402, a cavity 404, and a clip 406. The clip 406 includes opposing ends, a first containing the mechanical switch 402 and the other containing the cavity 404. In one embodiment, the clip 406 is spring-loaded and configured so that there is no gap between the mechanical switch 402 and cavity 404. Note that, although the cavity 404 is shown to be formed in the clip 406, it may be alternatively formed in a dedicated housing coupled to the clip 406, i.e., coupled to but separate from the clip itself.

Similar to the DON/DOFF sensor clip 300 shown and described above in FIGS. 3A and 3B, the mechanical switch 402 of the DON/DOFF sensor clip 400 in FIG. 4 functions as a detector and is configured such that a DON'd event is generated when the mechanical switch 402 is depressed and a DOFF'd event is generated when the mechanical switch 402 is released. When the DON/DOFF sensor clip 400 is configured in a DOFF'd state, as illustrated in FIG. 4A, the protruding end of the mechanical switch 402 is engaged into the corresponding cavity 404 such that the state of the mechanical switch 402 is not depressed. In the DON'd state, illustrated in FIG. 4B, a target object 408, such as the user's ear, is placed between the mechanical switch 402 and the cavity 404. In this configuration, the spring-loaded tension applied by the clip 406 provides force on both sides of the target object 408. This spring force is sufficient to depress the mechanical switch 402 against the side of the target object 408 that the mechanical switch 402 is on, thus triggering the generation of a DON'd event. The DON-indicating signal is then sent to the sensing electronics to be processed.

The DON/DOFF sensor clip 400 in FIG. 4 is beneficial in certain situations, since it does not consume power. The activation of the mechanical switch 402 simply closes a circuit. Additionally, mechanical switches can be obtained and produced very inexpensively. Unlike prior art mechanical-switch-based DON/DOFF sensors, the DON/DOFF sensor clip 400 in FIG. 4 is also able to avoid false triggers. This is because in its unworn state, the non-activated mechanical switch 402 is engaged with the cavity 404 by the spring force of the clip 406. Thus, since the mechanical switch 402 is completely enclosed, it is not possible for the sensor mechanism to be inadvertently activated by loose objects in the environment.

Figure 5B:
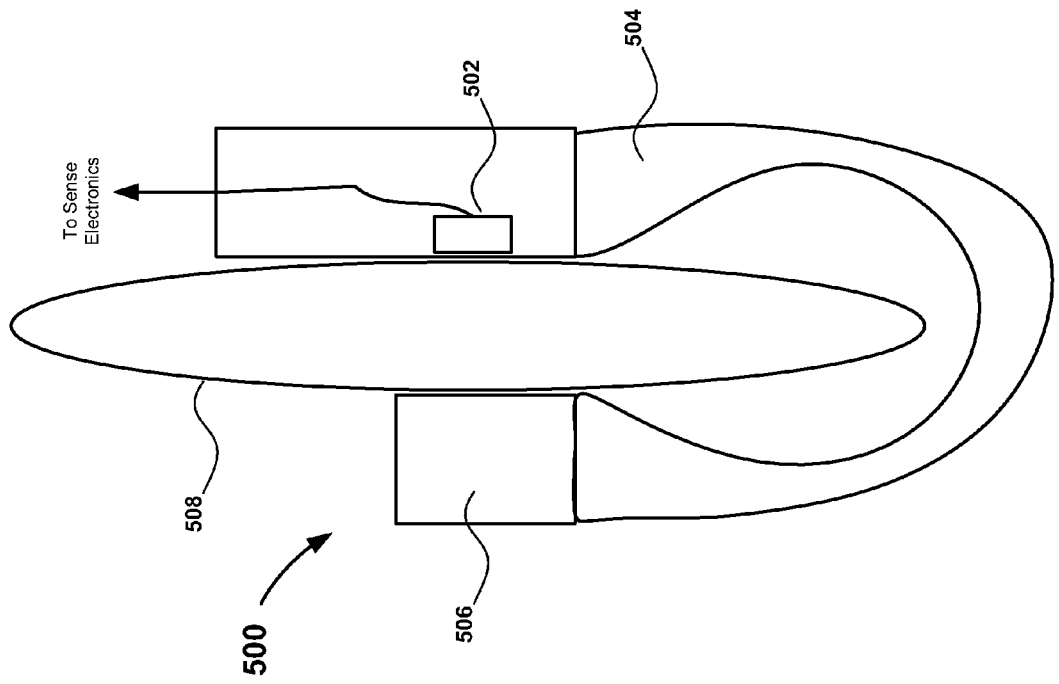
FIG. 5B is an alternative side-view drawing of the DON/DOFF sensor clip in FIG. 5A, where the DON/DOFF sensor clip is in a DON'd state.
Figure 5A:
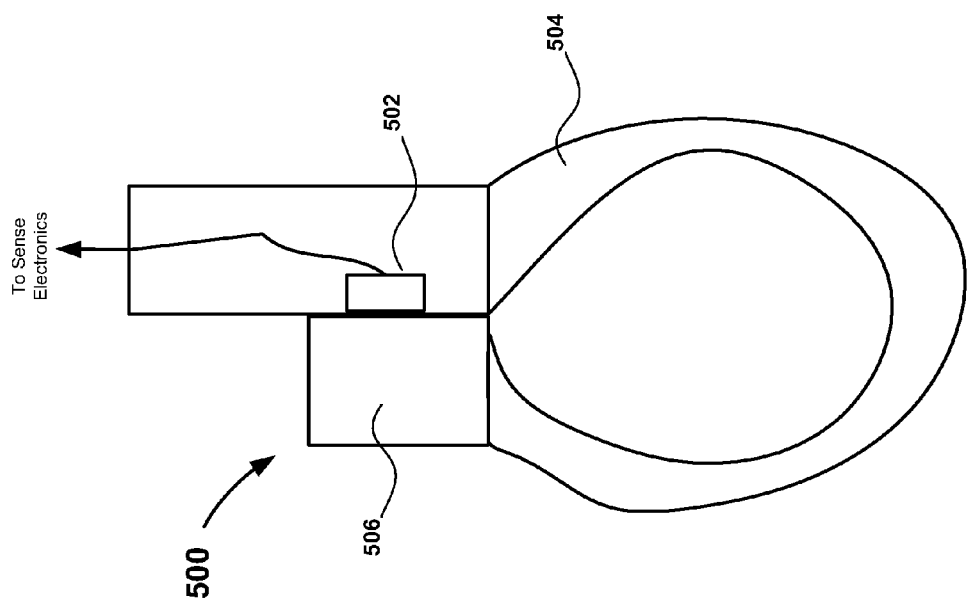
FIG. 5A is a side-view drawing of a DON/DOFF sensor clip of the clip-worn apparatus in FIG. 2, in accordance with an embodiment of the present invention, where the DON/DOFF sensor clip is in a DOFF'd state and utilizes a capacitive sensor.

FIG. 5A and FIG. 5B are drawings of a capacitive DON/DOFF sensor clip 500 that may be used to implement the DON/DOFF sensor clip 204 of the clip-worn apparatus 200 in FIG. 2, in accordance with an embodiment of the present invention. Capacitive sensors are contact sensors that have an advantage of being capable of discriminating between skin and other types of materials. Thus, in many applications capacitive sensors can allow for more accurate sensing by reducing the occurrence of false triggers caused by contact with other undesired targets. The DON/DOFF sensor clip 500 comprises a capacitive sensor 502 and a clip 504. The clip 504 includes a first end containing the capacitive sensor 502 and an opposing end 506. In one embodiment, the clip 504 of the DON/DOFF sensor clip 500 is spring-loaded and functions to apply pressure to both sides of the target object 508 (e.g. the user's ear) to ensure both ends of the clip 504 are pressed flush against the surfaces of the target object 508.

FIG. 5A is a side-view drawing of the DON/DOFF sensor clip 500 configured in the DOFF'd position. In this position, the absence of the target object 508 causes the spring-loaded action of the clip 506 to bring together its ends, such that the surface of the capacitive sensor 502 at the first end of the clip 504 is in flush contact with the opposing end 506. Since there is no contact at the capacitive sensor 502 with skin, the capacitive sensor 502 detects this position as the DOFF'd state and sends the corresponding signal to the sensing circuit (not pictured).

FIG. 5B shows the DON/DOFF sensor clip 500 in the DON'd position. In this position, the presence of the target object 508 between the capacitive sensor 502 and opposing end 506 of the clip 504 causes the first and opposing ends of the clip 504 to become non-adjacent. Yet, the forces exerted by the ends of the clip 504 ensure that contact is made between the surface of the target object 508 (i.e. the skin of the user's ear) and the capacitive sensor 502. This capacitive change triggers the capacitive sensor 502 to send a DON'd event signal to the sense electronics.

While several different embodiments of the DON/DOFF sensor clip 204 of the clip-worn apparatus 200 have been described, e.g., utilizing various signaling technologies, such as infrared light, mechanical, and capacitive types of sensors, those of ordinary skill in the art will readily appreciate and understand with the benefit of this disclosure that other signaling and detection techniques may be used. For example, conductivity is a property that can be used to detect the presence of a target object between two electrodes that are mounted at each of the two ends of the clip. In a DOFF'd state, a small test current would easily pass from one electrode to the other, since the spring-loaded clip would bring the two electrodes in contact with each other. During the DON'd state, the target object being placed between the two electrodes would cause increased electrical resistance, thus attenuating the conductivity, resulting in a DON'd event.

In another embodiment of the invention, sound pressure is detected in order to sense the presence of the target object. Since ultrasonic frequencies are beyond the limit of human hearing, sound is generated in the ultrasonic frequencies without disturbing the output of the electronic device 202. According to this embodiment, the DON/DOFF sensor 204 is configured to include a transducer and ultrasound detector to determine the presence of the target object. When the target object is present, it acts to dampen the ultrasonic waves output by the transducer compared to when the target object is not present. This difference can be detected by the ultrasound detector and used to determine the DON/DOFF state.

Another property that could be used in detection of the target object is temperature. Temperature could be used in several ways. One way to use temperature would be to utilize a digital thermometer at one end of the support clip to measure the average temperature at the contact point to the skin, similarly to how capacitance is measured in the DON/DOFF sensor clip 500 shown and described above in FIGS. 5A and 5B. In this embodiment, the spring-loaded action of the clip of the DON/DOFF sensor clip provides pressure that brings the digital thermometer in contact with the skin. The temperature measured by the thermometer would then be used to detect whether there is contact with the skin. Heat conduction is also a property that can be used to discriminate the presence of a target object. Heat flow can be measured by having one end generate heat (or cool) and having the other end detect the rate of heat (or cool) flow. The presence of a fleshy target object between the heat (or cool) generator and detector would impede the flow of heat. This difference could then be used to determine a DON/DOFF state.

Another physical property that can be modulated by the target object is coil inductance. Coil inductance is affected by the presence of nearby conductors. Therefore a nearby fleshy target object could cause a coil inductance levels to change. The inductance could be measured by sampling the frequency of an oscillating circuit containing a coil.

Magnitude of magnetic fields can also be used to detect the presence of a target object. Given a fixed magnet, strength of the surrounding local field correlates directly to the distance to the fixed magnet. This relation can be used the ends of the clip have been separated (and the target object placed between). This could be implemented by having a fixed magnet in one side of the spring loaded clip and a magnetic-reed switch in the other side, which functions to detect the strength of the magnetic field. The difference in the magnitudes of the detected magnetic field when the clip is worn or unworn can then be used to determine the DON/DOFF state. In one example, a permanent magnet in one side of the clip is used and a magnetometer is used to detect the strength of the magnetic field.

Another property of the target object that can be utilized in detection is differences in spectral reflectance. In an alternative embodiment of the invention, at one end of a clip, a light source is configured to emit light at the target object as well as a light detector configured to detect reflected light radiation. At the opposing end of the clip, a highly reflective surface, such as metal or polished plastic is affixed. In the DOFF'd state of the device (i.e., when the target object is not present), the light emitted by the light source is reflected by the reflective surface at the opposing end of the clip. In the DON'd state of the device (i.e., when the target object is present), the light emitted by the light source is reflected largely by the target object (e.g. the user's ear), which may be a less reflective surface. Differences in the relative reflectivity can then be used by the sense electronics to differentiate the DON and DOFF conditions. Alternatively, a surface material that is more diffuse than the target object may also be used at the opposing end, also resulting in differences in reflectivity.

Figure 6B:
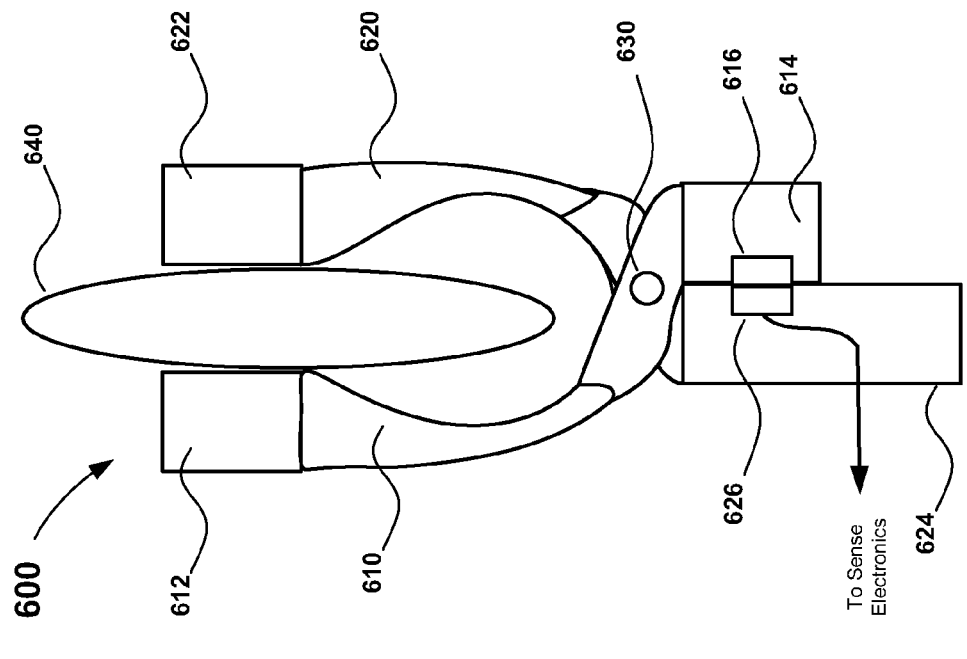
FIG. 6B is an alternative side-view drawing of the rocker-arm DON/DOFF sensor clip in FIG. 6A, where the rocker-arm DON/DOFF sensor clip is in a DON'd state.
Figure 6A:
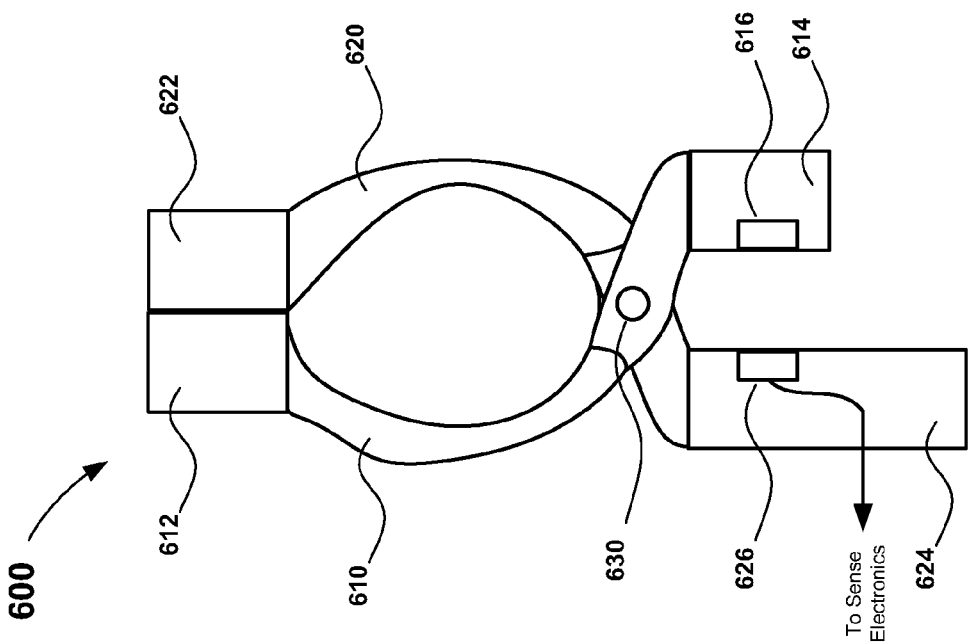
FIG. 6A is a side-view drawing of a rocker-arm DON/DOFF sensor clip, in accordance with an embodiment of the invention, where the rocker-arm DON/DOFF sensor clip is in a DOFF'd state and utilizes a conductivity detector.

Besides a choice of many different classes of sensors for measuring different physical properties, alternatives in the means of mechanical support are also presently contemplated. For example, FIGS. 6A and 6B are drawings of a rocker arm type of DON/DOFF sensor clip 600, which may be used to implement the DON/DOFF sensor clip 204 of the clip-worn apparatus 200 in FIG. 2, in accordance with an embodiment of the present invention. As shown, the DON/DOFF sensor clip 600 comprises two rocker arms 610 and 620, a pivot 630, a source 616 and a detector 626. The first rocker arm 610 is pivotally coupled to the second rocker arm 620 at the pivot 630. The first rocker arm 610 further comprises a distal end 612 and a source end 614 housing the source 616. Similarly, the second rocker arm 620 further comprises a distal end 622 and a detector end 624 housing the detector 626.

FIG. 6A is a side-view drawing of the DON/DOFF sensor clip 600 in a DOFF'd state, without any target object between the two distal ends 612 and 622 of the two rocker arms 610 and 620. In other words, there is no gap between the two distal ends 612 and 622 of the corresponding rocker arms 610 and 620. This places the rocker arms 610 and 620 about the pivot 630, such that a gap is created between the corresponding source and detector ends 614 and 624. This separates the source 616 and the detector 626 from contact with each other. The state of the detector 626 in this position is configured to encode a DOFF event. Additionally the pivot 630 may be spring-loaded, so that the DON/DOFF sensor clip 600 in the worn state conforms to this configuration.

In the DON'd state, the DON/DOFF sensor clip 600 is configured as shown in FIG. 6B, by clipping the distal ends 612 and 622 to the target object 640. This action pivots the rocker arms 610 and 620, resulting in contact between the source and detector ends 614 and 624. This state of the detector 626 is determined to be a DON'd event. Many types of sources and detectors may be adapted for use in this device, including the numerous sensing technologies described previously. In one embodiment of the invention, the DON/DOFF sensor clip 600 is adapted to utilize conductivity as a means for detecting the positioning of the rocker arms. This can be achieved by using an electrode as the source 616 at the source end and an electrode and current detector on the detector end 624 and determining whether there is a closed path between the two electrodes. If current is detected, then a DON'd event is indicated and if a discontinuation of current is detected, then a DOFF'd event is indicated. In one example, the source 616 is a first electrode and the detector is a second electrode coupled to a current meter.

With the design goal of additionally improving the false trigger ratio of the DON/DOFF sensor a multi-sensor clip-worn apparatus is contemplated. In this embodiment of the invention, a collection of multiple sensors are used to implement the DON/DOFF sensor clip 204. In this configuration, a DON'd state in all sensors in the system is required to indicate a DON'd state in the overall system. Otherwise, a DOFF'd state is indicated. This allows for even greater selectivity and potential for reduction of false triggers, as the number of conditions that need to be met in order to indicate DON'd can be customized and expanded.

In typical usage of a multi-sensor clip-worn apparatus, the user wears the multi-sensor clip-worn apparatus on his or her ear, engaging all of the component sensors. The joint occurrence of DON detections in each of the component sensors is then combined to indicate a DON'd event for the overall system. In the case that fewer than all of the component sensors are activated, no DON'd event is indicated.

In the case of a telephone system wherein the electronic device is a headset, the DON/DOFF state of a clip-worn apparatus with DON/DOFF sensor clip can be used by the system for many application areas such as presence, security, and power management. Presence applications refers to communications applications that take advantage of information regarding whether the user is nearby and/or has donned the headset to optimize the experience for the user, or report on the user state to others. For example, if the user is currently not wearing the headset, the system may decide to deliver the communications to the user via alternate means such as instant message or e-mail message. Volume levels on the speaker could also be differentially adjusted depending on the DON/DOFF state of the headset. On the other hand, if the user currently is wearing the headset, a phone call received by a connected phone could be configured to be automatically answered when a DON'd state is detected. This could be utilized, for example, in a call center environment to allow the user to receive calls without the delay involved with any manual manipulation.

Security applications might include preventing certain unauthorized actions on a phone system while the corresponding headset is not donned. For example, the DON/DOFF state could be combined with a user identifier in the headset to serve as an access control key to a telephone communications system, thereby preventing access from unauthorized users and unauthorized headsets.

Power management applications might include placing a telephone system in a low-power state if the headset is not donned. This is particularly useful for mobile systems that use a fixed battery power source.

Regardless of the application of DON/DOFF sensors, the presence of falsely detected events results in suboptimal performance. For example, inaccurate DON/DOFF information sent by the sensor might lead to phone calls that are incorrectly answered while the user is not present and available. False DON/DOFF triggers may lead to draining a battery power source unnecessarily when the device is not being used.

While the above is a complete description of the preferred embodiments of the invention sufficiently detailed to enable those skilled in the art to build and implement the system, it should be understood that various changes, substitutions, and alterations may be made without departing from the spirit and scope of the invention as defined by the appended claims.

What is claimed:

1. A clip-worn apparatus, comprising:
   an electronic device; and
   a DON/DOFF sensor clip coupled to said electronic device, said DON/DOFF sensor clip including a clip having first and second opposing ends, the first end of said first and second opposing ends including a detector configured to detect whether a target object is positioned between the first and second opposing ends.

2. The clip-worn apparatus of claim 1 wherein said clip provides a tensile force such that when the target objects is not positioned between the first and second opposing ends of the clip, the clip brings the first and second opposing ends in proximity to each other.

3. The clip-worn apparatus of claim 1, further comprising sense electronics, configured to receive a sense signal from an output of said detector indicating whether said electronic device is being worn.

4. The clip-worn apparatus of claim 1 wherein said electronic device comprises a headset.

5. The clip-worn apparatus of claim 1 wherein the target object comprises a user's ear.

6. The clip-worn apparatus of claim 1 wherein said detector is physically positioned at the first end of said clip so said detector is physically isolated from a surrounding environment when said DON/DOFF sensor clip is configured in both DON'd and Doff'd states.

7. The clip-worn apparatus of claim 1 wherein said detector comprises a mechanical switch configured to detect a presence of the target object.

8. The clip-worn apparatus of claim 1 wherein said detector comprises a capacitive sensor configured to detect contact with the target object.

9. The clip-worn apparatus of claim 1 wherein said detector comprises a temperature sensor configured to detect a surface temperature of the target object.

10. The clip-worn apparatus of claim 1 wherein said detector comprises a coil inductor circuit configured to measure inductance in a coil.

11. The clip-worn apparatus of claim 1 wherein the second opposing end of said clip includes a source.

12. The clip-worn apparatus of claim 11 wherein said source comprises a light source and said detector comprises a light detector.

13. The clip-worn apparatus of claim 11 wherein said source comprises a first electrode and said detector comprises a second electrode coupled to a current meter.

14. The clip-worn apparatus of claim 11 wherein said source comprises a sound transducer and said detector comprises a sound detector.

15. The clip-worn apparatus of claim 11 wherein said source comprises a heat source and said detector comprises a heat sensor.

16. The clip-worn apparatus of claim 11 wherein said source comprises a permanent magnet and said detector comprises a magnetometer.

17. The clip-worn apparatus of claim 11 wherein said source is physically positioned at the second opposing end of said clip so that said source is physically isolated from a surrounding environment when said DON/DOFF sensor is configured in both DON'd and DOFF'd states.

18. The clip-worn apparatus of claim 1, further comprising a source included in the first end of said clip.

19. The clip-worn apparatus of claim 18 wherein said source is configured to emit a source signal and said detector is configured to detect reflections of the emitted source signal from the target object when the target object is positioned between the first and second ends of said clip.

20. The clip-worn apparatus of claim 1 wherein said clip comprises:
   a first rocker arm;
   a second rocker arm; and
   a pivot coupling said first rocker arm to said second rocker arm.

21. A method for operation of an electronic device comprising:
   receiving a sensor output from a sensor disposed in a sensor clip, the sensor clip arranged to attach to a target object;
   processing the sensor output to identify a worn state or a not worn state of an electronic device; and
   configuring an operation of the electronic device responsive to identifying the worn state or the not worn state.

22. The method of claim 21, wherein the operation comprises delivery of a communication.

23. The method of claim 21, wherein the operation comprises an electronic device volume level.

24. The method of claim 21, wherein configuring an operation of the electronic device responsive to identifying the worn state or the not worn state comprises configuring the electronic device to automatically answer a phone call received by an associated phone.

25. The method of claim 21, wherein the sensor clip comprises a first arm and a second arm.

26. The method of claim 21, wherein the electronic device is a headset.

* * * * *